United States Patent [19]

Mansy et al.

[11] Patent Number: 4,843,889
[45] Date of Patent: Jul. 4, 1989

[54] TRAPPED-VORTEX PAIR FLOWMETER

[75] Inventors: Hussein A. E. Mansy; David R. Williams, both of Chicago, Ill.

[73] Assignee: Gas Research Institute, Chicago, Ill.

[21] Appl. No.: 192,804

[22] Filed: May 11, 1988

[51] Int. Cl.[4] ............................................. G01F 1/00
[52] U.S. Cl. ................................ 73/861.19; 137/826; 137/833
[58] Field of Search ....................... 73/861.19, DIG. 8; 137/804, 826, 833, 842

[56] References Cited

U.S. PATENT DOCUMENTS

| | | |
|---|---|---|
| 3,500,849 | 3/1970 | McLeod, Jr. |
| 3,589,185 | 6/1971 | Burgess |
| 3,640,133 | 2/1972 | Adams |
| 3,690,171 | 9/1972 | Tippetts et al. |
| 3,855,859 | 12/1974 | Adams ............................. 73/861.19 |
| 3,885,434 | 5/1975 | Williamson |
| 4,085,615 | 4/1978 | Haefner et al. |
| 4,184,636 | 1/1980 | Bauer |
| 4,244,230 | 1/1981 | Bauer |
| 4,550,614 | 11/1985 | Herzl |
| 4,610,162 | 9/1986 | Okabayashi et al. |

OTHER PUBLICATIONS

"Fluidic Flow Measurement and Control Devices", Measurement and Control, vol. V, No. 10, Oct. 1972, R. F. Boucher and J. K. Royle.
"Experimental Investigation of a Fluidic Volume Flowmeter", *Journal of Basic Engineering*, Mar. 1970, M. P. Wilson, Jr., C. H. Coogan, Jr., K. Southall.
"Gas Measurement, Domestic Gas Meter Adjustment Using Coanda Mastermeters", *Australian Gas Journal*, Jun. 1982, Dr. P. H. Wright.
"The Coanda Meter-a Fluidic Digital Gas Flow Meter", J. Phys. E: Sci. Instrum., vol. XIII, 1980, P. H. Wright, Great Britain.
"Whither Metering", Institution of Gas Engineers, 123rd Annual General Meeting, Princess Theatre, Torquay, Great Britain, May 13-15, 1986, pp. 25-26.

*Primary Examiner*—Herbert Goldstein
*Attorney, Agent, or Firm*—Thomas W. Speckman; Douglas H. Pauley

[57] ABSTRACT

A trapped-vortex pair flowmeter having a body with an inlet and an outlet. The inlet has a nozzle which forms a fluid jet having two primary counter-rotating vortices. The body has a chamber between the inlet and outlet through which the fluid jet flows. Two wedges are secured within the chamber. Each wedge has an inner side and an outer side. The inner sides of both wedges form a converging channel between the upper portions of both wedges. Both wedges have a gap between the inner sides of the wedges through which the converging channel passes. The inlet nozzle directs the fluid jet into the converging channel. A small portion of the fluid jet flows through the gap within the converging channel, but the majority of the fluid jet flows back over the top sections and down the outer sides of the wedges. Pressure sensors located within the chamber detect alternating high and low pressures at various points within the chamber. The fluid flow rate is proportional to the frequency of the oscillation of the two primary counter-rotating vortices within the main fluid jet stream.

15 Claims, 2 Drawing Sheets

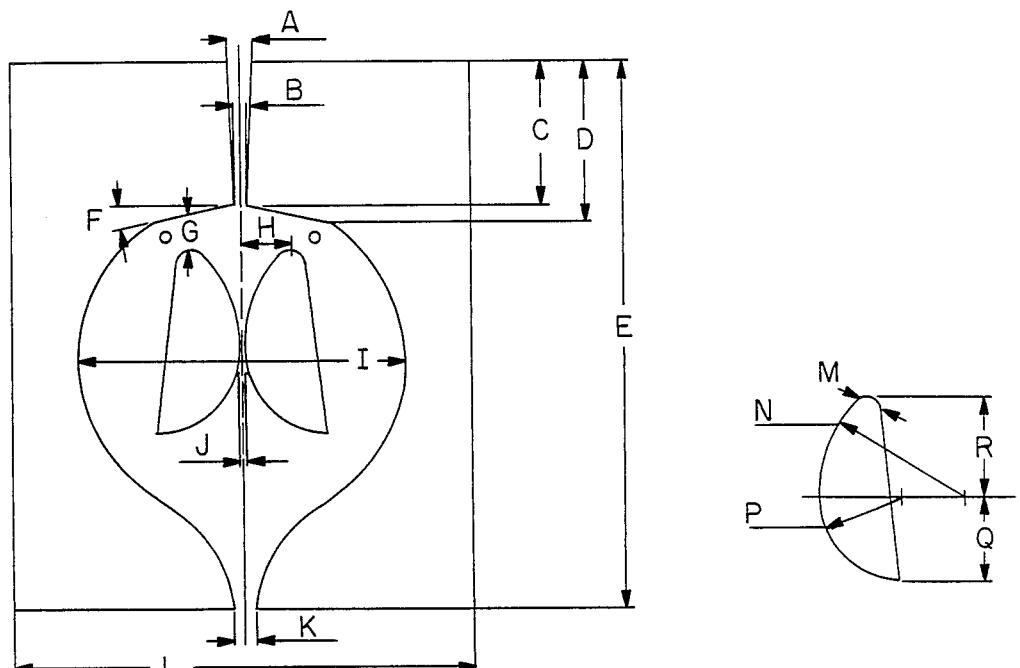
FIG.3
FIG.4
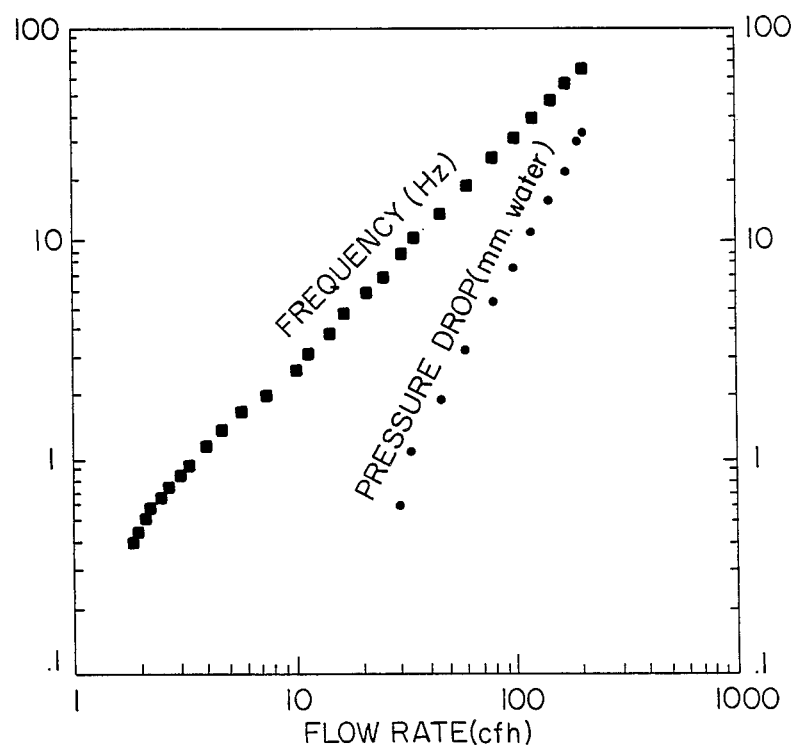
FIG.5

TRAPPED-VORTEX PAIR FLOWMETER

BACKGROUND OF THE INVENTION

1. Field of the Invention

This invention relates to a trapped-vortex pair flowmeter which uses a fluctuating pressure field created by an oscillating pair of vortices to measure a very wide range of volumetric flow rates of any type of fluids.

2. Description of the Prior Art

Several devices exist for measuring fluid flow. Two major groups of flowmeters include those which have moving parts such as turbine flowmeters and those which have no moving parts. In an article entitled "Fluidic Flow Measurement and Control Devices" in Measurement and Control, Vol. V, No. 10, October 1972, R.F. Boucher and J.K. Royle describe many types of flowmeters. Flowmeters having moving parts rely on the frequency of a mechanical element to determine volumetric flow rates. Flowmeters having no moving parts rely not on the frequency of a mechanical element but rather on the frequency of a portion of the fluid which has oscillation characteristics due to hydrodynamic instability. Either a flow or pressure sensor detects such oscillation characteristics.

R.F. Boucher and J.K. Royle further teach types of flowmeters including vortex shedding flowmeters, vortex precession flowmeters and oscillating jet flowmeters. Existing oscillating jet flowmeters basically operate by having a turbulent jet flowing into an expansion chamber which is divided into two by a splitter thus forming two outlets for the flow. Further downstream within the chamber, both outlets of the expansion chamber merge into one outlet. Two nozzles are symmetrically situated at right angles to a supply nozzle, located upstream from the expansion chamber. Both symmetrically situated nozzles or control ports are connected together to form a control loop or feedback loop. A pressure difference across the jet varies with time and causes an alternating clockwise then counterclockwise flow in the control loop which forces the jet to alternate back and forth between both outlets within the expansion chamber. As the flow rate increases, the frequency of strong spontaneous oscillations also increases. Flow or pressure sensing devices provide measurement readings on the frequency of the oscillations which is proportional to the fluid flow rate.

R.F. Boucher and J.K. Royle further teach that "suitable body geometry is a matter of considerable investigations. Not only must the geometry be selected from within the limited range of parameters for which oscillation is guaranteed, but choice is further limited by jitter (random frequency variations), noise, reasonableness of geometry, low manufacturing tolerances on dimensions and of course, low characteristic and minimum Reynolds numbers." R.F. Boucher and J.K. Royle further teach that a feedback loop or control loop has fundamental importance in a flowmeter having no moving parts since the inertia of the feedback loop or control loop determines the time delay in establishing switching flow in each half cycle.

In an article entitled "Experimental Investigation of a Fluidic Volume Flowmeter" in Journal of Basic Engineering, March 1970) M.P. Wilson, Jr., C.H. Coogan, Jr. and K. Southall generally describe flowmeters, the effect of design parameters on oscillation frequency, and locations of feedback inlet nozzles.

Another type of flowmeter which has no moving parts is the Coanda Meter which operates with a feedback loop. In an article entitled "Gas Measurement, Domestic Gas Meter Adjustment Using Coanda Mastermeters", the Australian Gas Journal, June 1982, Dr. P.H. Wright describes Coanda meters which are essentially fluidic feedback oscillators based upon the Coanda effect. The Coanda effect is the phenomenon in which a turbulent fluid jet flows into a diverging channel and tends to follow only one of the diverging walls. Random fluctuations in the main fluid jet determine which wall the fluid jet follows. A downstream portion of the fluid flow is directed through a feedback channel or feedback loop back upstream to a low pressure region near the main nozzle where the fluid jet begins to bend toward one wall. The redirected flow through the feedback channel or feedback loop into the low pressure region causes the fluid jet to detach from one wall and flow along an opposite wall. In an article entitled "The Coanda Meter—A Fluidic Digital Gas Flow Meter", J. Phys. E: Sci. Instrum., Vol. XIII, 1980, printed in Great Britain, P.H. Wright explains the basic operation of a Coanda meter.

In an article entitled "Whither Metering", the Institution of Gas Engineers, 123rd Annual General Meeting, Princess Theatre, Torquay, Great Britain, May 13-15, 1986, at pgs. 25 and 26, a fluidic type meter and its principle of operation is generally described. The article states that since flow oscillations stop at a given flow rate in a fluidic-type meter, "It is unlikely that a single such meter will be able to cover the required flow range alone and a separate low flow sensor will be needed." The article further states that considerable efforts are being devoted to investigate alternative sensing devices which have capabilities to cover turbulent fluid flow oscillations according to the Coanda effect as well as the characteristics of low flows.

McLeod, U.S. Pat. No. 3,500,849 teaches a free-running oscillator having a closed fluid oscillator chamber, an inlet nozzle for directing a cntinuous power stream into one end of the oscillator chamber and a single fluid outlet port which is offset axially from the power stream. The '849 patent teaches a device only for oscillating a free-running fluid stream.

Burgess, U.S. Pat. No. 3,589,185 teaches a flowmeter having an obstacle assembly mounted within a flow conduit. Such obstacle assembly generates strong stabilized oscillations in the downstream wake of the flow conduit. The '185 patent further teaches the obstacle assembly as a contoured block having a triangular or delta-shaped cross section which is uniform throughout the longitudinal axis of the block. The '185 patent teaches a sensor which protrudes into a downstream portion of the fluid flow stream. The sensor may be in the form of thermistor, sound-responsive transducer, or a differential pressure sensor.

Adams, U.S. Pat. No. 3,640,133 teaches a flowmeter having a fluid interaction chamber and a feedback loop which provides oscillation to the flow. The '133 patent further teaches a flowmeter which sets up a frequency proportional to the volumetric flow rate. The proportional relationship remains the same for any compressible or incompressible fluid as long as the flow is turbulent and subsonic.

Tippetts et al, U.S. Pat. No. 3,690,171 teaches a fluidic oscillator having an entry nozzle, control ports or feedback loop, outlet channels and a splitter. The '171 patent further teaches a channel extending between the outlet channels which houses a microphone providing electromagnetic differential pressure sensing means electrically connected with a frequency meter calibrated in terms of flow rate. The relationship between frequency of oscillation and flow rate depends on the dimensions of the fluidic oscillator, thus physical dimensions of the fluid flow measurement device must be changed as various flow rates change.

Williamson, U.S. Pat. No. 3,885,434 teaches a flowmeter having one moving part, a ball inside of a tube. The '434 patent teaches a ball inside of a tube and a stop to prevent the ball from moving longitudinally within the tube and with the flow of the fluid. The ball which is detected by inspection from outside the tube has rotational and lateral movement proportional to the rate of the flow of the fluid.

Haefner et al, U.S. Pat. No. 4,085,615 teaches a linear flowmeter having an interaction chamber and a feedback loop which causes fluid oscillations. The frequency of oscillation is proportional to the volumetric flow rate through the linear flowmeter.

Bauer, U.S. Pat. No. 4,184,636 teaches a fluidic oscillator having a chamber with a common inflow and outflow opening into which a jet is issued in a generally radial direction. The '636 patent further teaches vortices which alternate in strength and position to direct outflow through the common opening along one side and then the other side of the inflowing jet. The concentration and distribution of a sweeping spray pattern can be readily controlled by properly configuring the oscillator and/or output chamber.

Bauer, U.S. Pat. No. 4,244,230 teaches a fluidic oscillator flowmeter having two members of semi-ovate cross section transposed transversely across a pipe with the major axis of the semi-oval parallel to the flow direction. Both semi-ovate members are slightly spaced apart to define a downstream tapering nozzle between the two semi-ovate members. The downstream ends of both semi-ovate members are formed as downstream-facing cups. The '230 patent further teaches a third body member having an oscillation chamber defined therein to receive flow from a nozzle. The oscillation chamber of the third member has a concave U shape portion into which a fluid jet is directed.

The '230 patent teaches a pair of tiny pressure ports defined in an impingement wall end of the oscillation chamber. The jet impingement point is on the far wall of the oscillation chamber. The '230 patent teaches a chamber which may be asymmetric. The exiting flow is completely blocked by one of the vortices during some phase in the oscillation. The '230 patent further teaches that the side walls of the oscillation chamber are concave with respect to the axis of the main fluid jet and the oscillation chamber has a closed bottom through which no fluid escapes.

Herzle, U.S. Pat. No. 4,550,614 teaches an oscillatory flowmeter having a diverter which acts to split flow from a power nozzle into a control stream that is diverted toward the inlet of an associated feedback loop and an output stream that is directed toward an output duct. The '614 patent further teaches the sensing of resultant fluidic forces exerted alternately on the diverter, the sensor outputs are processed to generate a sinusoidal wave from which volumetric flow or mass output signals are derived.

Okabayashi et al, U.S. Pat. No. 4,610,162 teaches a fluidic flow meter having a combination of an upstream fluidic element and a downstream fluidic element. The '162 patent further teaches a bypass passage disposed parallel to one fluidic element having a jet nozzle with a smaller opening area than the opening area of a jet nozzle of the other fluidic element. The bypass passage also has a valve means, preferably a diaphragm type governor valve, which has a main valve member and an auxiliary valve member adapted to open by a fluid pressure upstream thereof when the main valve member is in a closed position.

SUMMARY OF THE INVENTION

It is an object of this invention to provide a flowmeter which has no moving parts and measures the volumetric flow rate of fluids over a very wide range of flow rates.

It is another object of this invention to provide a flowmeter having no moving parts which operates in both laminar and turbulent flow zones.

It is yet another object of this invention to provide a flowmeter having no moving parts which has a relatively low overall pressure drop across the flowmeter.

It is yet another object of this invention to provide a flowmeter having no moving parts in which a jet impingement occurs on side walls of a convex side of a stationary member.

This invention provides for a trapped-vortex pair flowmeter having a body with an inlet and an outlet. In a preferred embodiment of this invention, an inlet nozzle forms a fluid jet and directs the fluid jet into a chamber located within the body between the inlet and outlet of the body. The fluid jet flows into and out of the chamber. The fluid jet has two primary counter-rotating vortices and a plurality of secondary vortices.

Two wedges are secured within the chamber. Each wedge has an inner side and an outer side. A converging channel is formed between the inner sides of two wedges. There is a gap between the two wedges through which the converging channel passes. The inlet nozzle directs a portion of the fluid jet into the converging channel, through the gap and out of the outlet of the chamber.

The chamber has at least one pressure tap which generates a pressure measurement reading to a pressure transducer or a differential pressure transducer. The flow of the fluid jet through the chamber produces counter-rotating vortices. The fluid oscillates from the side of one wedge to the side of another wedge and thus creates variations in the pressure across the chamber. The frequency of the fluid oscillations is almost linearly proportional to the fluid flow rate.

BRIEF DESCRIPTION OF THE DRAWINGS

FIG. 3 shows an example of a trapped-vortex pair flowmeter as shown in FIG. 1, FIG. 3 does not show the cross-sectional hatches as shown in FIG. 1 for ease of labeling and reading the dimensions;

FIG. 4 shows an example of a wedge as shown in FIG. 3; and

FIG. 5 shows a plotted graph of frequency versus flow rate and pressure drop versus flow rate for a typical trapped-vortex flowmeter as shown in FIG. 4 and 5.

DESCRIPTION OF THE PREFERRED EMBODIMENTS

Figure 1:
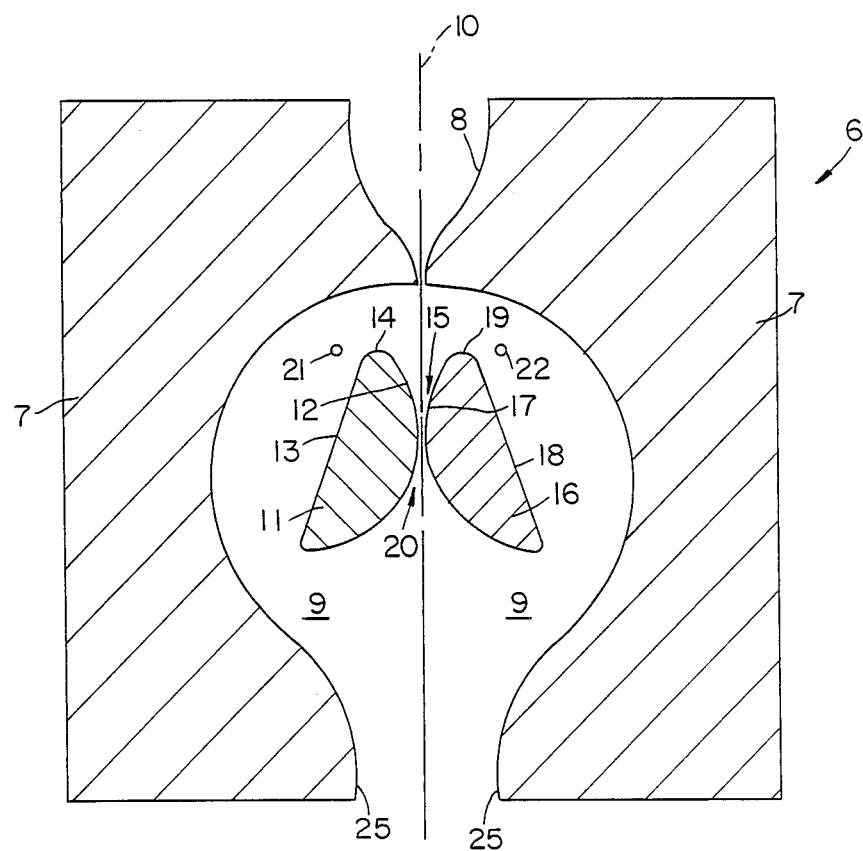
FIG. 1 shows a cross-sectional top view of a trapped-vortex pair flowmeter according to one embodiment of this invention.

FIG. 1 shows a cross-sectional top view of a trapped-vortex pair flowmeter according to one embodiment of this invention. Trapped-vortex pair flowmeter 6 has body 7 with inlet nozzle 8 and outlet 25. Inlet nozzle 8 issues a fluid jet stream having two primary counter-rotating vortices about fluid jet centerline 10 and a plurality of secondary vortices. Inlet nozzle 8 directs the fluid jet along fluid jet centerline 10 into chamber 9. It is apparent that other methods exist for issuing and directing a fluid jet stream, such as other various shaped nozzles, a long straight run of tubing, orifice plates and the like.

Wedges 11 and 16 are secured within chamber 9. In a preferred embodiment of this invention, outside wall 13 of wedge 11 and outside wall 18 of wedge 16 are straight. Inside wall 12 of wedge 11 and inside wall 17 of wedge 16 have a convex curvature. It is an important aspect of this invention that inside wall 12 and inside wall 17 each have a convex curvature, both symmetric about fluid jet centerline 10, so that trapped-vortex pair flowmeter 6 has a wide flow rate range of operation. A design of trapped-vortex pair flowmeter 6 having straight inside walls 12, 17 will work but only in a limited range of flow rates. Top section 14 of wedge 11 and top section 19 of wedge 16 form a rounded connection between outside wall 13 and inside wall 12 of wedge 11 and outside wall 18 and inside wall 17 of wedge 16, respectively.

Gap 20 is formed between inside wall 12 of wedge 11 and inside wall 17 of wedge 16. Converging channel 15 is formed between the upper sections of inside wall 12 and inside wall 17. Converging channel 15 passes through gap 20. Inlet nozzle 8 directs the fluid jet into converging channel 15. A portion of the fluid from the fluid jet flows through gap 20 between wedge 11 and wedge 16, but the majority of the fluid from the fluid jet flows back upward along inside walls 12, 17, over top sections 14, 19, downward along outside walls 13, 18, and through outlet 25. A low percentage of fluid, approximately less than 15 percent, flowing through gap 20 between wedges 11, 16 provides the best performance of trapped-vortex pair flowmeter 6.

It is apparent that inlet nozzle 8 and/or outlet 25 can sealably engage with a tube, pipe, hose or the like. It is also apparent that body 7 may have various exterior shapes which fit inside a tube or within a main stream of fluid flow. It is also apparent that inlet nozzle 8 may have various cross-sectional shapes, or can be a straight run of channel or a straight passageway within a body, or a run of straight tube, or the like; however, it is an important aspect of this invention to have a fluid jet with two primary counter-rotating vortices about fluid jet centerline 10.

Figure 2:
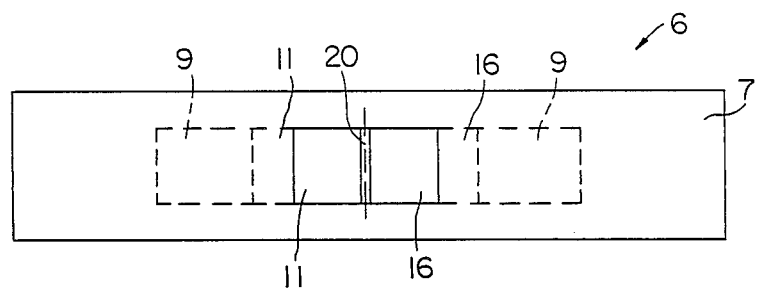
FIG. 2 shows an end view looking into the outlet of a trapped-vortex pair flowmeter as shown in FIG. 1.

It is apparent that wedges 11, 16 can have various convex shapes which form converging channel 15 and have a space between wedges 11, 16 which defines gap 20. Wedges 11, 16 can be made from various materials such as plastic, acrylic resins, metal, glass and the like. Wedges 11, 16 extend entirely across the thickness of chamber 9, as shown in FIG. 2. Chamber 9 and wedges 11, 16 can have a wide range of thicknesses without affecting the overall performance of trapped-vortex flowmeter 6.

In a preferred embodiment of this invention, pressure ports 21 and 22 are respectively located approximately between the side wall of chamber 9 and top section 14 of wedge 11 and top section 19 of wedge 16. It is apparent that pressure ports 21 and 22 can be located in other parts of chamber 9 which provide accurate readings for the purpose of determining the frequency of oscillations of the fluid jet.

An instability of a pair of trapped vortices provide the metering function and also classify the flowmeter as a fluidic-type flowmeter. The trapped-vortex principle of this invention is fundamentally different from the principles used by other existing fluidic meters. Existing flowmeter designs use either bluff bodies, the Coanda effect or a fluid feedback loop to generate a fluctuating pressure signal. The trapped-vortex method according to this invention uses a two dimensional fluid jet which forms two primary counter-rotating vortices. The two primary counter-rotating vortices are trapped in converging channel 15.

A portion of the fluid jet flows through gap 20 between wedges 11, 16, but the majority of the fluid jet spills over top sections 14, 19 and downward along outside walls 13, 18. The pair of trapped vortices in converging channel 15 are unstable and move in and out of converging channel 15 in alternating motion. The vortex motion generates alternating high and low pressures detected by pressure transducers connected to pressure ports 21, 22. Since a velocity field as well as the pressure field oscillate within chamber 9 at a frequency proportional to the flow rate, it is apparent that any type of flow sensing device, such as hot-wires, thermistors, laser anemometers, absolute or differential pressure transducers, or the like, can be used to determine and register the fluid oscillations.

Because the fluid introduced by the fluid jet flows both through gap 20 and around wedges 11, 16, a trapped-vortex pair flowmeter according to this invention operates at a higher fluid flow rate, at a given overall pressure drop across the flowmeter, as compared with other fluidic-type flowmeters. A trapped-vortex pair flowmeter according to this invention can measure volumetric flow rates of both laminar and turbulent fluid flow. Trapped-vortex pair flowmeter 6 provides accurate flow measurement readings of fluids over a wide range of flow rates.

Converging channel 15 prevents the counter-rotating vortices of the fluid jet from moving downstream. The vortices oscillate back and forth within the convergent part of converging channel 15, such oscillation generates a pressure fluctuation in the fluid flow at a frequency proportional to the flow rate. The frequency of the vortex pair oscillation has a nearly linear relationship with the flow rate.

The lower limit of flow rate registered by trapped-vortex pair flowmeter 6 according to this invention depends upon the Reynolds number. Below a certain Reynolds number the vortex pair will not oscillate and no pressure signal will result. The upper limit of flow rate through trapped-vortex flowmeter 6 according to this invention is determined by the overall pressure drop limitation across the flowmeter.

Trapped-vortex pair flowmeter 6 according to this invention uses an oscillating flow pattern which is fundamentally different from those flow patterns used in other existing flowmeters. The pressure fluctuations generated by the oscillating vortices trapped in converging channel 15 extend over a wider range of operation and yield a more accurate calibration than do other existing flowmeters. Trapped-vortex pair flowmeter 6 according to this invention has no loss of signal over the calibration range and always has a unique frequency associated with any given flow rate.

Other existing flowmeters having no moving parts have an impingement point located on a concave type surface with respect to the axis of the main fluid jet and the convave surface has a closed bottom. Trapped-vortex pair flowmeter 6 according to this invention has an impingement point located between two convex surfaces and a portion of the main jet stream flows through a gap between the convex surfaces. It is an important aspect of this invention to have portion of the fluid jet flowing through gap 20 to increase the overall efficiency of trapped-vortex pair flowmeter 6 by reducing the overall pressure drop across the flowmeter.

The following example sets forth a specific embodiment in detail and is meant to exemplify the invention and not to limit it in any way.

EXAMPLE

FIG. 3 shows an example of trapped-vortex pair flowmeter 6 according to one embodiment of this invention having the following dimensions:

A = 0.22 inch
B = 0.11 inch
C = 1.25 inches
D = 1.39 inches
E = 4.73 inches
F = 10°
G = 0.28 inch
H = 0.47 inch
I = 2.87 inches diameter
J = 0.040 inch
K = 0.22 inch
L = 4.00 inches FIG. 4 shows an example of wedge 16 having the following dimensions:

M = 0.20 inch diameter
N = 1.25 inches radius
P = 0.70 inch radius
Q = 0.70 inch
R = 0.86 inch In this specific example, the thickness of chamber 9 and wedges 11, 16 equals 0.94 inch.

FIG. 5 is a plotted graph of frequency versus flow rate and pressure drop versus flow rate for a typical trapped-vortex pair flowmeter 6 having the dimensions described above. Rangeability is generally defined as the maximum flow rate at a defined overall pressure drop divided by the minimum operational flow rate. For this specific example, the rangeability is defined as the flow rate at which the pressure drop is 15 mm H$_2$0 divided by the minimum flow rate. For this specific example, the rangeability is equal to 70. If no constraint is imposed on the upper flow rate, then the rangeability is at least 200.

The following test data provides the effect of the radius of curvature on inside walls 12, 17. For the dimensions given above in this example except for changing dimension B to B = 0.03 inch, when inside walls 12, 17 have a radius of curvature equal to +1.25 inches, a convex curve, the minimum flow rate is 0.82 cubic feet per hour (cfh). When inside walls 12, 17 have an infinite radius of curvature, a flat side, the minimum flow rate is equal to 0.95 cfh. When inside walls 12, 17 have a radius of curvature equal to −1.25 inches, a concave curve, no oscillation occurs.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A trapped-vortex pair flowmeter comprising: a body having an inlet and an outlet;
    fluid jet forming means forming a fluid jet, said fluid jet having two primary counter-rotating vortices and a plurality of secondary vortices;
    a chamber between said inlet and said outlet of said body, said fluid jet flowing into and out of said chamber;
    two wedges secured within said chamber, each said wedge having an inner side and an outer side, said inner sides of said wedges forming a converging channel between said inner sides of said wedges, said fluid jet forming means directing said fluid jet into said converging channel; and
    sensing means for providing fluid properties measurement readings at various points within said chamber, said sensing means having at least one sensing port located in said chamber.

2. A trapped-vortex pair flowmeter according to claim 1 wherein said body fits within a fluid flow stream.

3. A trapped-vortex pair flowmeter according to claim 1 wherein said body further comprises: a first tube sealably connected to said inlet of said body and a second tube sealably connected to said outlet of said body.

4. A trapped-vortex pair flowmeter according to claim I wherein said inner sides of said wedges have convex curves symmetric about a fluid jet centerline.

5. A trapped-vortex pair flowmeter according to claim 1 wherein said wedges are positioned to allow a first portion of said fluid jet to flow through said converging channel and out said outlet, and a remaining second portion of said fluid jet to flow upstream along an upstream portion of said inner side of each said wedge, over an upstream section of said wedge, downstream along said outer side of each said wedge, then out said outlet.

6. A trapped-vortex pair flowmeter according to claim 5 wherein said first portion of said fluid jet comprises approximately less than 15 percent of a fluid of said fluid jet.

7. A trapped-vortex pair flowmeter according to claim 1 wherein said chamber has concave upper side walls.

8. A trapped-vortex pair flowmeter according to claim 1 wherein said at least one sensing port is located above an upstream section of each of said wedges approximately between said upstream section of each of said wedges and upstream walls of said chamber.

9. A trapped-vortex pair flowmeter according to claim 1 wherein said sensing means further comprises two pressure ports located within said chamber and a differential pressure transducer in communication with said pressure ports.

10. A process for measuring fluid flow through a trapped-vortex pair flowmeter, the steps comprising:
    (a) forming a fluid jet having two primary counter-rotating vortices and a plurality of secondary vortices;

(b) issuing the fluid jet into a chamber of a body, the chamber positioned between an inlet and an outlet of the body;

(c) directing the fluid jet through a converging channel defined by and between an inner side of each of two wedges secured within the chamber; and (d) sensing fluid properties measurement readings at various points within the chamber.

11. A process according to claim 10 wherein the fluid is directed through the converging channel which is defined by the inner side of each of the two wedges having a convex curve symmetric about a fluid jet centerline.

12. A process according to claim 10 wherein a first portion of the fluid jet is directed through the converging channel and out of the outlet, and a remaining second portion of the fluid jet backflows upstream along an upstream portion of the inner side, over an upstream section of the wedge, downstream along an outer side of the wedge, then out the outlet.

13. A process according to claim 12 wherein the first portion of the fluid jet comprises approximately less than 15 percent of a fluid of the fluid jet.

14. A process according to claim 10 wherein the fluid properties are sensed using at least one sensing port located above an upstream section of each of the wedges approximately between the upstream section of each of the wedges and upstream walls of the chamber.

15. A process according to claim 10 wherein the fluid properties are sensed using two pressure ports located within the chamber and a differential pressure transducer which is in communication with the pressure ports.

* * * * *